United States Patent
Wasson

(10) Patent No.: US 6,404,227 B1
(45) Date of Patent: Jun. 11, 2002

(54) APPARATUS AND METHOD FOR INTERLEAVING A SIGNAL CARRY CHAIN IN AN INTEGRATED CIRCUIT

(75) Inventor: Stephen L. Wasson, Boulder Creek, CA (US)

(73) Assignee: Morphics Technology, Inc., Campbell, CA (US)

( * ) Notice: Subject to any disclaimer, the term of this patent is extended or adjusted under 35 U.S.C. 154(b) by 0 days.

(21) Appl. No.: 09/565,647

(22) Filed: May 5, 2000

Related U.S. Application Data

(60) Provisional application No. 60/133,144, filed on May 7, 1999.

(51) Int. Cl.$^7$ ........................... G06F 7/38; H03K 19/173
(52) U.S. Cl. ............................. 326/46; 326/41; 708/232
(58) Field of Search ............................... 326/38–41, 46, 326/47; 708/711, 712, 232, 235

(56) References Cited

U.S. PATENT DOCUMENTS

| | | | |
|---|---|---|---|
| 4,935,734 A | | 6/1990 | Austin .................... 340/825.83 |
| 5,629,886 A | * | 5/1997 | New ........................... 708/711 |

OTHER PUBLICATIONS

"XC4000 Series Field Programmable Gate Arrays", Sep. 18, 1996, Product Specification of XILINX, Version 1.04, pp. 4–5 through 4–24.*

* cited by examiner

Primary Examiner—Michael Tokar
Assistant Examiner—Daniel D. Chang
(74) Attorney, Agent, or Firm—Pennie & Edmonds LLP

(57) ABSTRACT

An interleaved signal carry structure includes a first signal line and a second signal line forming a first bus. A third signal line and a fourth signal line form a second bus. A first set of carry function generators are positioned between the first signal line and the third signal line. Carry-in signal lines are attached to the first set of carry function generators. A second set of carry function generators are positioned between the second signal line and the fourth signal line. Intermediate carry signal lines are positioned between the first set of carry function generators and the second set of carry function generators. Carry out signal lines are attached to the second set of carry function generators. A first vertical carry chain comprises a first carry function generator from the first set of carry function generators and a first carry function generator from the second set of carry function generators. A second vertical carry chain comprises a second carry function generator from the first set of carry function generators and a second carry function generator from the second set of carry function generators.

11 Claims, 2 Drawing Sheets

APPARATUS AND METHOD FOR INTERLEAVING A SIGNAL CARRY CHAIN IN AN INTEGRATED CIRCUIT

This application claims priority to the provisional application bearing serial No. 60/133,144 filed on May 7, 1999.

BRIEF DESCRIPTION OF THE INVENTION

This invention relates generally to the design and implementation of integrated circuits. More particularly, this invention relates to a technique for interleaving a signal carry chain in an integrated circuit.

BACKGROUND OF THE INVENTION

In the increasingly competitive market of integrated circuits, there is an ongoing need to improve the design and implementation of integrated circuits. Improving the design and implementation of integrated circuits in turn improves resource utilization and circuit performance. One way to improve the design and implementation of integrated circuits is to redesign the signal carry structures in integrated circuits, such as the signal carry structures in programmable logic devices.

Many integrated circuit designs today comprise bussing schemes between two busses of different sizes. In such circuits, performance degradation occurs in the bussing interconnect and/or arithmetic structures. Performance degradation occurs because arithmetic structures are constrained from carry chains that require a strictly bit-sequential ordering of the structure. Interconnect between two buses of different sizes may benefit by a different bit ordering, such as an interleaved order. For example, when communicating between a 32-bit bus and a 16-bit bus, it is common to interconnect both the upper and lower 16-bit words of the 32-bit bus to the 16-bit bus. That is, both 32-bit bus bits "31" and "15" interconnect to 16-bit bus bit "15", both 32-bit bus bits "30" and "14" interconnect to 16-bit bus bit "14", and so on. Given this interleaved relationship, it is desirable to arrange the bus in an interleaved fashion, known as an interleaved bus.

In contrast, contemporary macro generators, whether programmable or standard cell devices, generate arithmetic structures that are bit-sequential. Namely, 32-bit objects are generated from bit D31 down to bit D0, and 16-bit objects are generated from bit D15 down to bit D0. Such sequentially arranged structures do not expediently permit the interleaved bus scheme. To accommodate such an interleaved bus, data structures must be generated in a like-wise interleaved arrangement. However, in order to accommodate such interleaved data structures, programmable devices have to contain an interleaved carry structure.

Accordingly, it would be highly desirable to provide an improved technique for interleaving a signal carry chain in an integrated circuit.

SUMMARY OF THE INVENTION

An interleaved signal carry structure includes a first signal line and a second signal line forming a first bus. A third signal line and a fourth signal line form a second bus. A first set of carry function generators are positioned between the first signal line and the third signal line. Each carry function generator in the first set of carry function generators receives input from both the first signal line and the third signal line. Carry-in signal lines are attached to the first set of carry function generators. A second set of carry function generators are positioned between the second signal line and the fourth signal line. Each carry function generator in the second set of carry function generators receives input from both the second signal line and the fourth signal line. Intermediate carry signal lines are positioned between the first set of carry function generators and the second set of carry function generators. Carry out signal lines are attached to the second set of carry function generators. A first vertical carry chain comprises a first carry function generator from the first set of carry function generators and a first carry function generator from the second set of carry function generators. A second vertical carry chain comprises a second carry function generator from the first set of carry function generators and a second carry function generator from the second set of carry function generators.

An interleaved signal carry structure includes a first signal line and a second signal line forming a first bus. A third signal line and a fourth signal line form a second bus. A first set of carry function generators are positioned between the first signal line and the third signal line. Each carry function generator in the first set of carry function generators receives input from the first signal line and the third signal line. A set of carry-in signal lines are attached to a first end of each of the first set of carry function generators. A first set of logic elements is attached to a second end of each of the first set of carry function generators. The first set of logic elements is attached selectively at a second end to the first signal line and the third signal line. A second set of carry function generators are positioned between the second signal line and the fourth signal line. Each carry function generator in the second set of carry function generators receives inputs from the second signal line and the fourth signal line. A set of intermediate carry signal lines are attached between a third end of each of the first set of carry function generators and a first end of each of the second set of carry function generators. A second set of logic elements is attached at a first end to a second end of each of the second set of carry function generators. The second set of logic elements are attach selectively at a second end to the second signal line and the fourth signal line. A set of carry out signal lines attached to a third end of each of the second set of carry function generators. A first vertical carry chain comprises a first carry function generator from the first set of carry function generators and a first carry function generator from the second set of carry function generators. A second vertical carry chain comprises a second carry function generator from the first set of carry function generators and a second carry function generator from the second set of carry function generators.

Various embodiments of this invention provide signal carry structures that decrease routing resource consumption, thus, enhancing routing efficiency in programmable logic devices.

DETAILED DESCRIPTION OF THE INVENTION

The interleave carry structures of this invention provide physical layouts that enable contiguous carry chain function generators for two or more carry chains to interleave (alternate) with each other.

Figure 1:
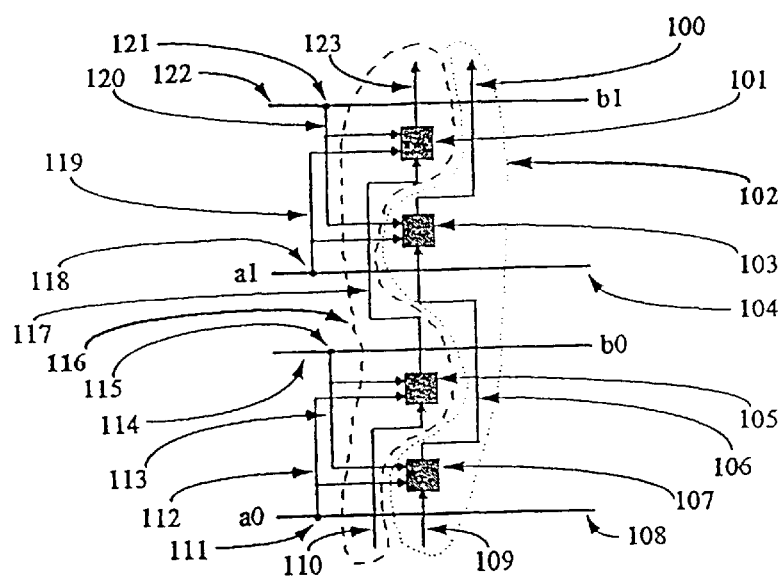
FIG. 1 illustrates an interleaved carry-by-row structure in accordance with an embodiment of the invention.

In FIG. 1, a first bus a[1:0] is comprised of signals a0 on line 108 and a1 on line 104, and a second bus b[1:0] is comprised of signals b0 on line 114 and b1 on line 122. The alternation of 108, 114, 104 and 122 is such that the first bus a[1:0], the "a" bus, and the second bus b[1:0], the "b" bus, are interleaved. A first carry chain 102 is comprised of a first carry function generator 107 and a second carry function generator 103, which are responsive to a carry input signal 109, an intermediate carry signal 106, and an output carry signal 100. A second carry chain 116 is comprised of a first carry function generator 105 and a second carry function generator 101, which are responsive to a carry input signal 110, an intermediate carry signal 117, and an output carry signal 123. The carry function generators of the first carry chain 102 are row interleaved with the carry function generators of the second carry chain 116. In an exemplary embodiment, a carry equation for a full adder is as follows: CO=A*B+A*Ci+B*Ci, where A and B are the two arithmetic inputs, Ci is the carry-in input, and CO is the carry out output.

Each carry function generator accepts input from both the "a" and the "b" bus such that the first carry function generators are connected to each first signal of each bus and the second carry function generators are connected to each second signal of each bus. Both the first carry function generator 107 of a first carry chain 102 and the first carry function generator 105 of a second carry chain 116 accept input from a first signal a0 on line 108 of the "a" bus by connection 111 and wire 112 and from a first signal b0 on line 114 by connection 115 and wire 113. Similarly, the second carry function generator 103 of a first carry chain 102 and the second carry function generator 101 of a second carry chain 116 accept input from a second signal a1 on line 104 of the "a" bus by connection 118 and wire 119 and from a second signal b1 on line 122 by connection 121 and wire 120.

If the carry function generators reside in the same column and their intermediate carry interconnectivity alternates by row, the carry function generators are said to be "interleaved by row." A "row" refers to an axis aligned to the data bus(es); the row therefore may be in either the horizontal or vertical axes depending on the physical structure of the data buses. Data bus signals do not need to be physically interleaved for carry function generators to interleave by row. However, in an exemplary embodiment, physically interleaved data bus signals are preferred.

Figure 2:
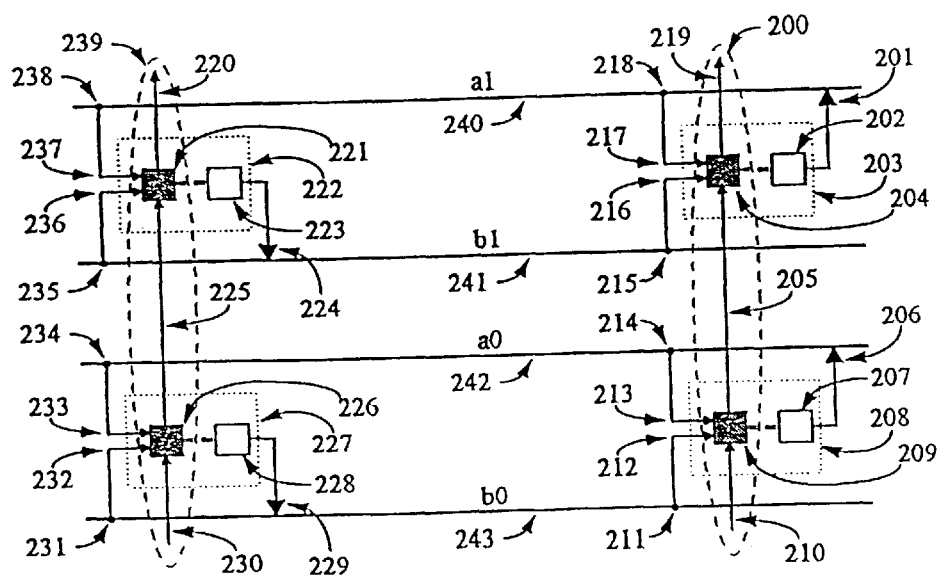
FIG. 2 illustrates an interleaved carry-by-column structure in accordance with an embodiment of the invention.

In FIG. 2, a first bus is comprised of a first signal a0 on line 242 and a second signal a1 line 240, and a second bus is comprised of a first signal b0 on line 243 and a second signal b1 on line 241. The alternation of 243, 242, 241 and 240 is such that the first bus a[1:0], the "a" bus, and the second bus b[1:0], the "b" bus, are interleaved. A first carry chain 200 is comprised of a first carry function generator 209 and a second carry function generator 204, which are responsive to a carry input signal 210, an intermediate carry signal 205, and an output carry signal 219. A second carry chain 239 is comprised of a first carry function generator 226 and a second carry function generator 221, which are responsive to a carry input signal 230, an intermediate carry signal 225, and an output carry signal 220. The carry function generators of the first carry chain 200 are column interleaved with the carry function generators of the second carry chain 239.

Each carry function generator accepts input from both the "a" and the "b" bus such that the first carry function generators are connected to each first signal of each bus and the second carry function generators are connected to each second signal of each bus. For example, the first carry function generator 209 of the first carry chain 200 accepts input from both a first signal b0 on line 243 of the "b" bus by connection 211 and wire 212 and a first signal a0 on line 242 of the "a" bus by connection 214 and wire 213.

The first carry function generator 209 is associated with a first logic element 207 in a first logic block 208. The first logic block 208 includes the first carry function generator 209 and the first logic element 207. The first logic element 207 may comprise, but is not limited to, any of the following: one or more Boolean gates, sequential elements (such as flip-flops or latches), random access memory ("RAM"), or look-up tables. The first logic element 207 is associated with the first carry function generator 209, such that at least a portion of either the output or input of the first carry function generator 209 is in common with the first logic element 207. The output of the first logic element 207, which is associated with the first carry function generator 209 of the first carry chain 200, is connected to the first signal a0 on line 242 of the first bus, "a."

The first carry function generator 226 of the second carry chain 239 accepts input from both a first signal b0 on line 243 of the "b" bus by connection 231 and wire 232 and a first signal a0 on line 242 of the "a" bus by connection 234 and wire 233. The first carry function generator 226 is associated with a first logic element 228 in a first logic block 227. The first logic block 227 includes the first carry function generator 226 and the first logic element 228. The first logic element 228 may comprise, but is not limited to, any of the following: one or more Boolean gates, sequential elements (such as flip-flops or latches), RAM, or look-up tables. The first logic element 228 is associated with the first carry function generator 226, such that at least a portion of either the output or input of the carry function generator 226 is in common with the first logic element 228. The output of the first logic element 228, which is associated with the first carry function generator 226 of the second carry chain 239, is connected to the first signal b0 on line 243 of the second bus, "b." The second carry function generators 204, 221 are similarly associated with logic elements, 202, 223, respectively.

In a first column are a first carry chain 200 and all it's associated logic elements and bus connections (identifiers 201 through 219 inclusive); in a second column are a second carry chain 239 and all it's associated logic elements and bus connections (identifiers 220 through 238 inclusive). If the carry function generators reside in the same column and the interconnectivity between the carry function generators, the logic elements, and bus signals, alternates by row, the carry function generators are said to be "interleaved by column." A "column" refers to an axis orthogonal to the data buses; the column therefore may be in either the horizontal or vertical axes depending on the physical structure of the data buses. Data bus signals do not need to be physically interleaved for a carry function generator to interleave by column. However, in an exemplary embodiment, physically interleaved data bus signals are preferred.

Figure 3:
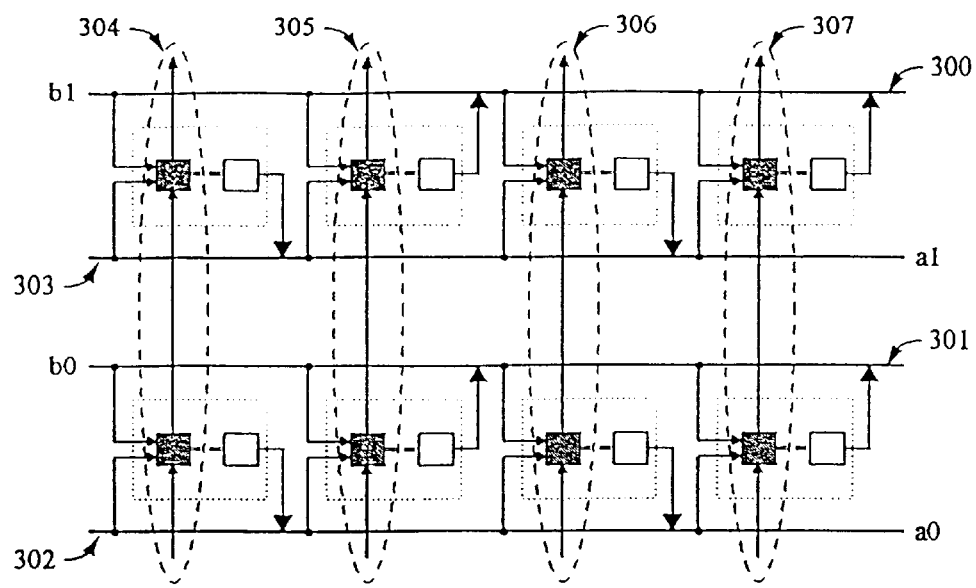
FIG. 3 is an extended example of an interleaved carry-by-column structure in accordance with an embodiment of the invention.

FIG. 3 is an extended example of carry function generators "interleaved by column." In FIG. 2, two carry chains 200 and 239 are shown interleaved by column. In FIG. 3, two pairs of carry chains are interleaved by column. Carry chains 304 and 306 are associated by their common source connection onto a first signal a0 on line 302 and a second signal a1 on line 303, both signals in the "a" bus. Carry function chains 305 and 307 are associated by their common source onto a first signal b0 on line 301 and a second signal b1 on line 300, both signals are in the "b" bus. The carry chains 304 and 305, carry chains 306 and 307, carry chains 304 and 307, and carry chains 305 and 306 are "interleaved by column."

Figure 4:
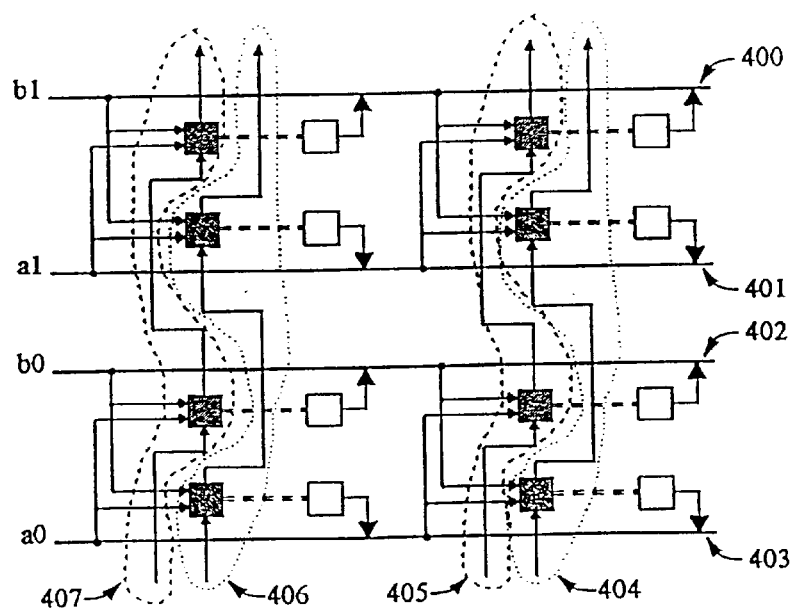
FIG. 4 is an extended example of an interleaved carry-by-row structure in accordance with an embodiment of the invention.

FIG. 4 is an extended example of carry "interleave by row." In FIG. 4, two pairs of carry chains are interleaving by row, for example, carry chain 404 interleaves with carry chain 405 and carry chain 406 interleaves with carry chain 407. Carry chains 404 and 406 are associated by their common source connection onto a first signal a0 on line 403 and a second signal a1 on line 401, both signals in the "a" bus. Carry chains 405 and 407 are associated by their common source onto a first signal b0 on line 402 and a second signal b1 on line 400, both signals in the "b" bus.

Persons skilled in the art will appreciate that "interleave by row" and "interleave by column" implementations of this invention can also be intermixed.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An interleaved signal carry structure, comprising:
    a first signal line and a second signal line forming a first bus;
    a third signal line and a forth signal line forming a second bus;
    a first set of carry function generators positioned between said first signal line and said third signal line, said first set of carry function generators receiving inputs from said first signal line and said third signal line;
    a set of carry-in signal lines attached to a first end of each generator of said first set of carry function generators;
    a second set of carry function generators positioned between said second signal line and said fourth signal line, said second set of carry function generators receiving inputs from said second signal line and said fourth signal line;
    a set of intermediate carry signal lines positioned between a second end of each generator of said first set of carry function generators and a first end of each generator of said second set of carry function generators;
    a set of carry out signal lines attached to a second end of each generator of said second set of carry function generators;
    a first vertical carry chain comprising a first carry function generator from said first set of carry function generators and a first carry function generator from said second set of carry function generators; and
    a second vertical carry chain comprising a second carry function generator from said first set of carry function generators and a second carry function generator from said second set of carry function generators.

2. The interleaved signal carry structure of claim 1, wherein said signal lines in said first bus and said signal lines in said second bus are interleaved.

3. An interleaved signal structure, comprising:
    a first signal line and a second signal line forming a first bus;
    a third signal line and a fourth signal line forming a second bus;
    a first set of carry function generators positioned between said first signal line and said third signal line, said first set of carry function generators receiving inputs from said first signal line and said third signal line;
    a set of carry-in signal lines attached to a first end of each generator of said first set of carry function generators;
    a first set of logic elements attached at a first end to a second end of each of said first set of carry function generators, said first set of logic elements attaching selectively at a second end to said first signal line and said third signal line;
    a second set of carry function generators positioned between said second signal line and said fourth signal line, said second set of carry function generators receiving inputs from said second signal line and said fourth signal line;
    a set of intermediate carry signal lines attached between a third end of each generator of said first set of carry function generators and a first end of each generator of said second set of carry function generators;
    a second set of logic elements attached at a first end to a second end of each of said second set of carry function generators, said second set of logic elements attaching selectively at a second end to said second signal line and said fourth signal line;
    a set of carry out signal lines attached to a third end of each generator of said second set of carry function generators;
    a first vertical carry chain comprising a first carry function generator from said first set of carry function generators and a first carry function generator from said second set of carry function generators; and
    a second vertical carry chain comprising a second carry functional generator from said first set of carry function generators and a second carry function generator from said second set of carry function generators.

4. The interleaved signal carry structure of claim 3, wherein said signal lines in said first bus and said signal lines in said second bus are interleaved.

5. The interleaved signal carry structure of claim 3, wherein said logic element is implemented with a device selected from the group consisting of: boolean gates, flip-flops, random access memory, and look-up tables.

6. An interleaved signal carry structure, comprising:
    a first signal line and a second signal line forming a first bus;
    a third signal line and a fourth signal line forming a second bus;
    a first set of carry function generators positioned between said first signal line and said third signal line, said first set of carry function generators receiving inputs from said first signal line and said third signal line;
    a first set of carry-in signal lines attached to a first end of each generator of said first set of carry function generators;

a first set of logic elements attached at a first end to a second end of each of said first set of carry function generators, said first set of logic elements attaching selectively at a second end to said first signal line and said third signal line;

a second set of carry function generators positioned between said second signal line and said fourth signal line, said second set of carry function generators receiving inputs from said second signal line and said fourth signal line;

a set of intermediate carry signal lines attached to a third end of each generator of said first set of carry function generators and a first end of each generator of said second set of carry function generators;

a set of carry out signal lines attached to a second end of each generator of said second set of carry function generators;

a second set of logic elements attached at a first end to a third end of each of said second set of carry function generators, said second set of logic elements attaching selectively at a second end to said second signal line and said fourth signal line;

a first vertical carry chain comprising a first carry function generator from said first set of carry function generators and a first carry function generator from said second set of carry function generators;

a second vertical carry chain comprising a second carry function generator from said first set of carry function generators and a second carry function generator from said second set of carry function generators;

a third vertical carry chain comprising a third carry function generator from said first set of carry function generators and a third carry function generator from said second set of carry function generators; and a fourth vertical carry chain comprising a fourth carry function generator from said first set of carry function generators and a fourth carry function generator from said second set of carry function generators.

7. The interleaved signal carry structure of claim 6, wherein said signal lines in said first bus and said signal lines in said second bus are interleaved.

8. The interleaved signal carry structure of claim 6, wherein said logic element is implemented with a device selected from the group consisting of: boolean gates, flip-flops, random access memory, and look-up tables.

9. A method for interleaving signal carry structure, comprising the steps of:

forming a first bus including a first signal line and a second signal line;

forming a second bus including a third signal line and a fourth signal line;

positioning a first set of carry function generators between said first signal line and said third signal line;

attaching carry-in signal lines to a first end of each generator of said first set of carry function generators;

positioning a second set of carry function generators between said second signal line and said fourth signal line;

positioning intermediate carry signal lines between a second end of each generator of said first set of carry function generators and a first end of each generator of said second set of carry function generators; and attaching carry out signal lines to a second end of each generator of said second set of carry function generators;

wherein a first vertical carry chain comprises a first carry function generator from said first set of carry function generators and a first carry function generator from said second set of carry function generators; and wherein a second vertical carry chain comprises a second carry function generator from said first set of carry function generators and a second carry function generator from said second set of carry function generators.

10. A method for interleaving signal carry structure, comprising the steps of:

forming a first bus line including a first signal line and a second signal line;

forming a second bus line including a third signal line and a fourth signal line interleaving said signal lines in said fist and second buses;

positioning a first set of carry function generators between said first signal line of said first bus and said third signal line of said second bus;

attaching carry-in signal lines to a first end of each generator of said first set of carry function generators;

attaching a first set of logic elements at a first end to said carry function generators;

attaching a second end of said first set of logic elements to said first signal line and said third signal line;

positioning a second set of carry function generators between said second signal line of said first bus and said fourth signal line of said second bus;

positioning intermediate carry signal lines between a second end of each generator of said first set of carry function generators and a first end of each generator of said second set of carry function generators;

attaching a second set of logic elements at a first end to said second set of carry function generators;

attaching said second set of logic elements at a second end to said second signal line and said fourth signal line; and attaching carry out signal lines to a second end of each generator of said second set of carry function generators;

wherein a first vertical carry chain comprises a first carry function generator from said first set of carry function generators and a first car function generator from said second set of carry function generators; and wherein a second vertical carry chain comprises a second carry function generator from said first set of carry function generators and a second carry function generator from said second set of carry function generators.

11. A method for interleaving signal carry structure, comprising the steps of:

forming a first bus including a first signal line and a second signal line;

forming a second bus including a third signal line and a fourth signal line;

positioning a first set of carry function generators between said first signal line and said third signal line;

attaching carry-in signal lines to a first end of each generator of said first set of carry function generators;

attaching a first set of logic elements at a first end to said first set of carry function generators;

attaching said first set of logic elements at a second end to said first signal line and said third signal line;

positioning a second set of carry function generators between said second signal line and said fourth signal line;

positioning intermediate carry signal lines between a second end of each generator of said first set of carry function generators and a first end of each generator of said second set of carry function generators;

attaching carry out signal lines to a second end of each generator of said second set of carry function generators;

attaching a second set of logic elements at a first end to said second set of carry function generators; and attaching said second set of logic elements at a second end to said second signal line and said fourth signal line;

wherein a first vertical carry chain comprises a first carry function generator from said first set of carry function generators and a first carry function generator from said second set of carry function generators; and wherein a second vertical carry chain comprises a second carry function generator from said first set of carry function generators and a second carry function generator from said second set of carry function generators.

* * * * *